May 16, 1950             I. SHAFER             2,507,820
SEED TREATING ATTACHMENT FOR CONVEYERS
Filed Sept. 17, 1948                 2 Sheets-Sheet 1
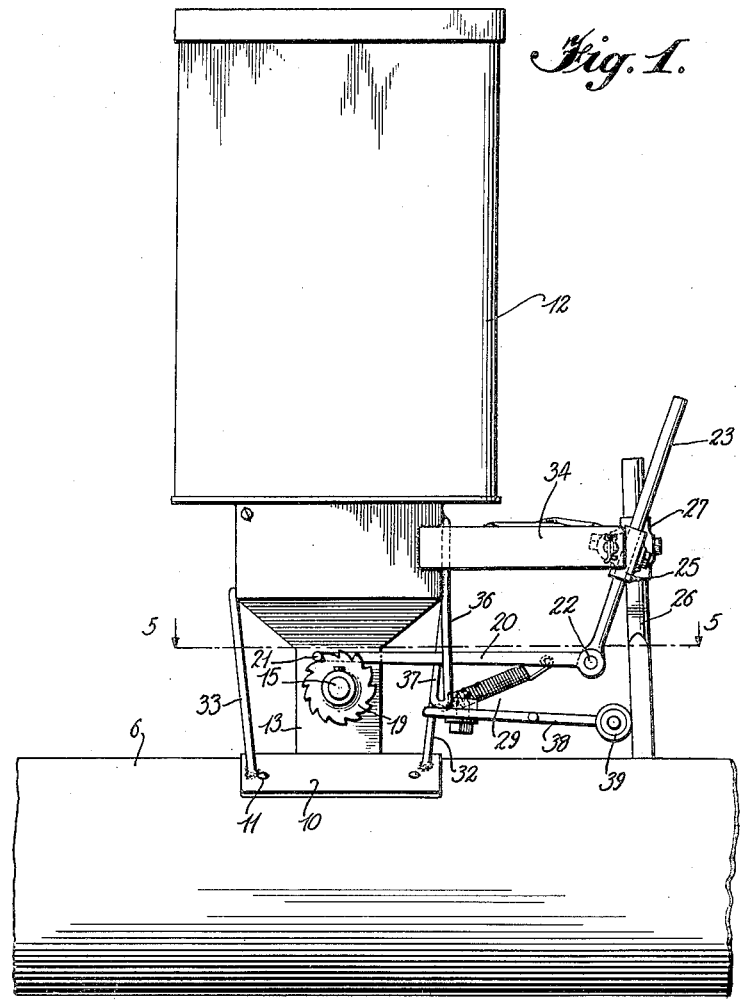
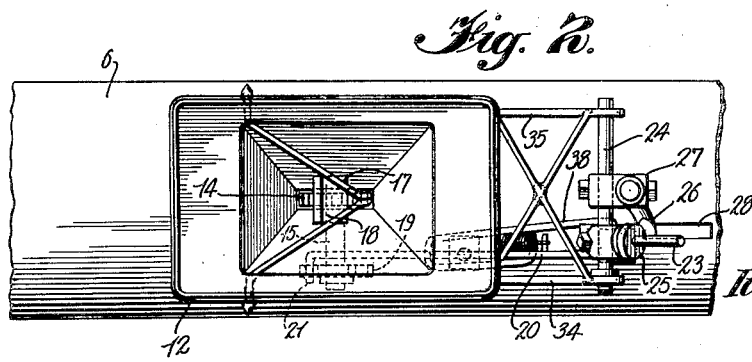
Inventor
Ivan Shafer
By Burns, Doane & Benedict
Attorneys

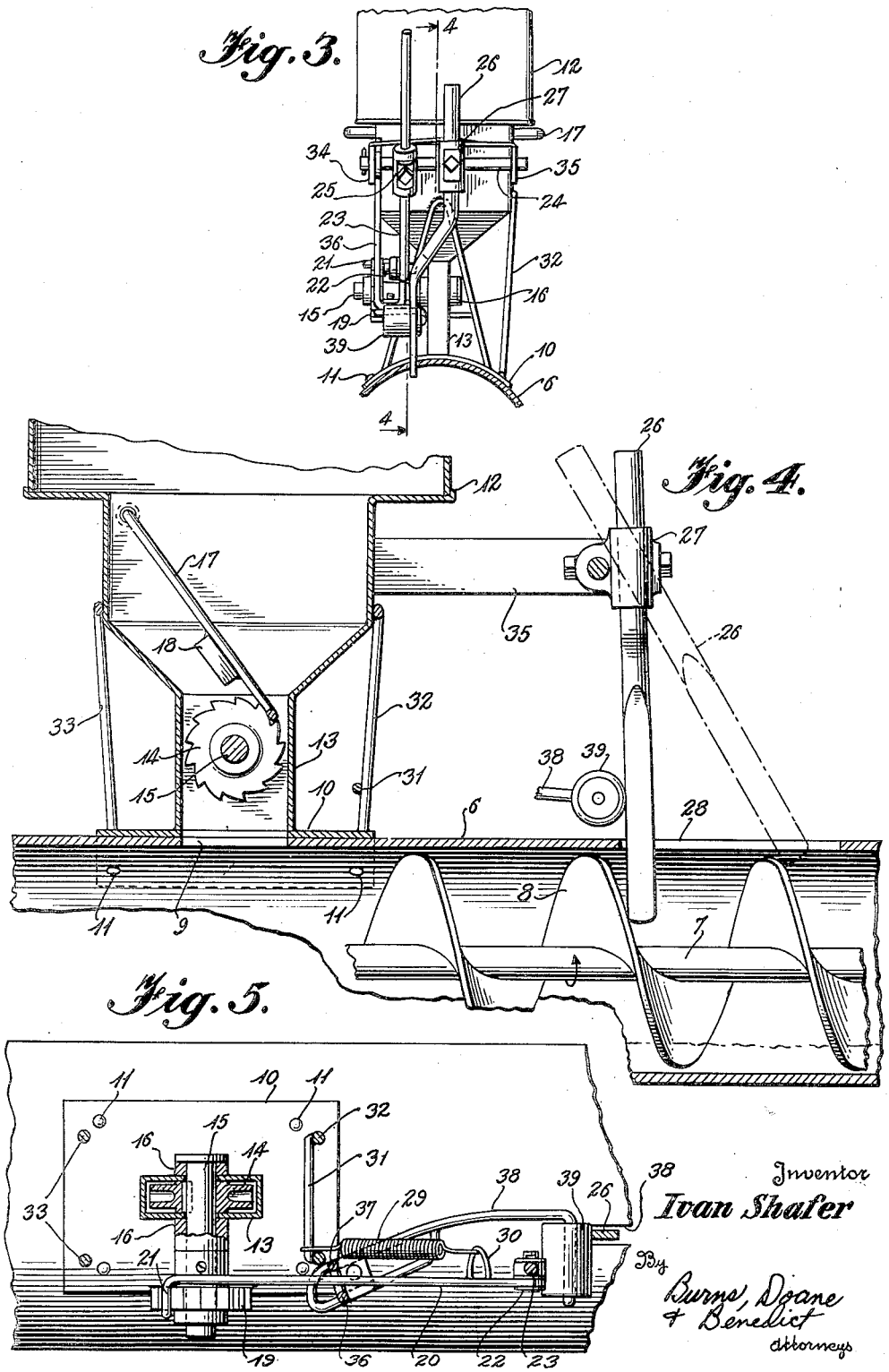

Patented May 16, 1950

2,507,820

UNITED STATES PATENT OFFICE 2,507,820

SEED TREATING ATTACHMENT FOR CONVEYERS

Ivan Shafer, Oakes, N. Dak.

Application September 17, 1948, Serial No. 49,809

2 Claims. (Cl. 198—64)

This invention relates to a seed treating attachment for conveyors.

The germination properties of seeds can be improved by treating the seeds with certain materials which are usually in powder form. It is also possible to improve the keeping qualities of grains by intimately mixing small amounts of certain treating powders with the grains. It is sometimes possible to reduce the likelihood that newly planted seeds will be eaten by burrowing rodents by mixing certain treating powders with the seeds prior to planting. It is convenient to add the treating powder to the seed or grain while the seed or grain is being elevated or conveyed from one location to another and my invention relates to an attachment for a conventional type of conveyor which permits an appropriate treating powder to be added to and intimately mixed with the seed or grain being conveyed. My invention is not limited to the use of any particular treating powder and the invention will find utility in any instance where it is desired to add a powdered material to seed, grain, or other dry material being conveyed.

The attachment which is the subject matter of the present invention is particularly intended for use with conveyors of the auger type. Such conveyors are in common use and consist essentially of a trough or casing having a rotatable shaft extending longitudinally of the casing and a helical conveyor blade extending around and along the shaft. Some means is provided for rotating the shaft. The grain or other material to be conveyed is deposited in one end of the casing or trough and is conveyed to the opposite end by the helical blade on the rotating shaft.

A primary object of my invention is to provide a simple and inexpensive attachment for an auger conveyor which will deliver measured or metered amounts of a powder to the material being conveyed.

Another object of my invention is to provide an attachment of the type described which derives power for its operation from the auger of the conveyor in a simple and effective manner.

A still further object of the invention is to provide an attachment for the purpose described which can be easily and quickly attached to new or old conveyors of the auger type.

Other objects and advantages of the invention will be referred to in the following detailed description which has reference to the accompanying drawings wherein:

Figure 1 is a side-elevation view of one of my attachments mounted on the casing of a conveyor;

Figure 2 is a top-plan view thereof;

Figure 3 is an end-elevation view thereof;

Figure 4 is a longitudinal-sectional view taken in the direction of the arrows along the line 4—4 of Figure 3; and Figure 5 is a transverse-sectional view taken in the direction of the arrows along the line 5—5 of Figure 1.

The attachment which constitutes the subject matter of my invention is intended to be mounted on the trough or casing 6 of a conveyor. The conveyor is provided with a centrally disposed longitudinally extending rotatable shaft 7 which has secured thereto a helical blade 8. The shaft 7 is rotated by any suitable power means, not shown. The conveyor as thus far described is conventional and no more detailed description appears to be necessary.

An aperture 9 is formed in the upper surface of the casing 6 and the mounting flange 10 of the attachment is positioned over the aperture 9 and secured to the casing 6 by any suitable means such as rivets 11. A hopper 12 for treating powder is positioned above the mounting plate 11 and interposed between the hopper 12 and the aperture 9 is a powder outlet 13.

A rotatable feeding and metering device in the form of a toothed gear 14 is positioned within the powder outlet 13 and is fixed on a rotatable shaft 15 which is mounted in bearings 16 on the walls of the powder outlet 13. As is best shown in Figures 2 and 4, a generally V-shaped member 17 has its upper ends mounted in openings in the walls of the hopper 12 for swinging or oscillating movement within the hopper. The lower end of the member 17 is in engagement with the toothed periphery of the feeding and metering device 14. The member 17 serves two purposes. It permits rotation of the toothed feeding and metering gear 14 in one direction while preventing rotation of this gear in the opposite direction. The member 17 also serves to eliminate bridging of the powder in the hopper by its swinging movement as the lower end thereof rides over the teeth on the gear 14 during rotation of that gear. The member 17 has a weighted bar 18 attached thereto to assure that the lower end of this member remains in contact with the toothed periphery of the gear 14.

There is fixed on one outer end of the shaft 15 a ratchet gear 19. A ratchet arm 20 is provided at one end with an angularly disposed portion 21 which is disposed in parallel relationship to the shaft 15 and which engages the teeth on the periphery of the ratchet gear 19. The opposite end of the ratchet arm 20 is pivotally connected at 22 to the lower end of a crank arm 23. The crank arm 23 is adjustably fixed to a countershaft 24 by means of a clamp 25 which permits longitudinal adjustment of the crank arm 23 relative to the countershaft 24 but which prevents rotation of the countershaft 24 relative to the crank arm.

An actuating arm 26 is also fixed to the countershaft 24 by means of a clamping device 27 which permits angular adjustment of the actuating arm 26 relative to the countershaft and which also permits longitudinal adjustment of the actuating arm 26. The lower end of the actuating arm 26 extends through a slot 28 which is formed in the upper surface of the casing 6 of the conveyor.

The actuating arm 26 is shown in one position by the full lines in Figure 4. It will be noted that the lower end of the actuating arm 26 (full line position) is in engagement with the helical blade 8 of the conveyor screw or auger. The shaft 7 and the helical blade 8 rotate in the direction of the arrow shown in Figure 4. During rotation of the shaft 7 and the helical blade 8, the lower end of the actuating arm 26 will be caused to swing to the right as viewed in Figure 4 until the actuating arm occupies approximately the position shown in dotted lines. It will be seen that in the dotted line position of the actuating arm 26 the lower end of that arm is about to ride over or clear the periphery of the helical blade 8. A very slight additional advancement of the shaft 7 and the helical blade 8 will permit the lower end of the actuating arm 26 to clear the periphery of the helical blade 8. As soon as this happens the actuating arm will be returned to approximately its full line position by means hereinafter described. The swinging movement of the actuating arm 26 will then be repeated. The swinging movement of the actuating arm 26 will cause oscillation of the countershaft 24 and swinging movement of the crank arm 23. The swinging movement of the crank arm 23 will cause the angular end 21 of the ratchet arm 20 to engage the teeth on the periphery of the ratchet wheel 19. The generally reciprocating movement of the ratchet arm 20 will cause intermittent rotation of the ratchet gear 19. It will be apparent from an inspection of Figure 1 that movement of the ratchet arm 20 toward the right will cause rotation of the ratchet gear 19, the shaft 15, and the feeding and metering device 14. During movement of the ratchet arm 20 to the left as viewed in Figure 1 the angular portion 21 will ride over the teeth on the periphery of the ratchet gear 19 and the member 17 will prevent reverse rotation.

The return of the actuating arm 26 from approximately the dotted line position shown in Figure 4 to approximately the full line position shown in that figure is accomplished by means of a tension spring 29 which has one of its ends attached to a loop 30 on the ratchet arm 20. The opposite end of the spring 29 is secured to a cross brace 31 which in turn is secured to upright bracing struts 32 which extend from the mounting plate 10 to the hopper 12. Similar bracing struts 33 are positioned between the opposite end of the mounting plate 10 and the hopper 12. The countershaft 24 is mounted in apertures in the outer ends of beams 34 and 35 which are welded or otherwise secured to the hopper 12. The hopper 12 also has secured thereto a downwardly extending and laterally spaced pair of struts 36 and 37 and the ratchet arm 20 extends between these two struts and is thereby guided to assure that the angular portion 21 of the ratchet arm 20 remains in position to engage the teeth on the periphery of the ratchet gear 19. It will be noted by reference to Figure 1 that the spring 29 is so positioned that it exerts a slight downward force on the ratchet arm 20 to retain the angular portion 21 in contact with the periphery of the ratchet gear 19.

A bumper member is adjustably secured to the lower ends of the downwardly extending struts 36 and 37. This bumper member is indicated by the reference numeral 38 and it carries at its free end a cushioning member 39 of rubber or other suitable resilient material. The cushioning member 39 is positioned so that it acts as a cushioning stop member for the return movement of the actuating arm 26.

It has been pointed out that the actuating arm 26 is longitudinally adjustable and is also adjustable in an angular relationship about the countershaft 24. The crank arm 23 is capable of having its effective length adjusted by means of the clamping member 25. These two adjustments permit a wide variation in the extent of rotation of the ratchet gear 19, the shaft 15, and the feeding and metering device 14 for each cycle of movement of the actuating arm 26. It is possible in this way to vary the amount of powdered treating material which is fed from the hopper 12 into the conveyor.

The feeding of the powdered treating material into a conveyor of the auger type is particularly effective for the reason that the treating material is intimately mixed with the grain or other material being conveyed because of the action of the helical blade 8 of the auger.

I have illustrated and described what I now consider to be the preferred form of my invention. It will be understood, however, that the form of the invention illustrated and described is exemplary only and that various changes and modifications may be resorted to without departing from the scope of the invention as defined by the following claims.

Having thus described my invention, I claim:

1. A seed treating attachment for a screw conveyor of the type having a casing and a helical screw rotatable therein, said attachment comprising mounting means for mounting the attachment on the casing of the conveyor, a hopper for seed treating material, an outlet from said hopper to the interior of said casing, a rotatable feeding and metering device positioned in said outlet, an arm pivotally mounted on said attachment with one end of the arm arranged to be positioned in the path of movement of the helix on said screw to cause said arm to pivot in one direction upon engagement with said helix and to continue to pivot in such direction until such end rides over and disengages said helix, means to pivot said arm in the opposite direction when said arm disengages said helix, and means operatively connecting said feeding and metering device to said arm to cause rotation of the former during pivotal movement of the latter.

2. A device for adding powder to material being conveyed in a conveyor of the type which includes a casing and a rotatable helical screw extending longitudinally of the casing, said device comprising a hopper for the powder, means for mounting said hopper on the casing of the conveyor, a powder outlet passage from said hopper for discharging powder into the casing, a movable feeding member positioned in said powder outlet, an actuating arm pivotally mounted on said device and having one end arranged to engage the helix on the conveyor screw to swing said actuating arm in one direction until such end rides over said helix, means for swinging said actuating arm in the opposite direction, and an operative connection between said actuating arm and said feeding device causing actuation of the latter during swinging movement of the former.

IVAN SHAFER.

No references cited.